US012256213B1

(12) United States Patent
Csabi et al.

(10) Patent No.: US 12,256,213 B1
(45) Date of Patent: *Mar. 18, 2025

(54) PARALLEL DATA PROVISION

(71) Applicant: United Services Automobile Association (USAA), San Antonio, TX (US)

(72) Inventors: Rachel Elizabeth Csabi, Frisco, TX (US); Hollie Ilene King, Frisco, TX (US); Victor Kwak, Frisco, TX (US); Zachery C. Lake, Aubrey, TX (US); Yogen Rai, Plano, TX (US); Samantha Elizabeth Taylor, Frisco, TX (US); Nicholas C. Wheeler, The Colony, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/475,982

(22) Filed: Sep. 27, 2023

Related U.S. Application Data

(63) Continuation of application No. 18/086,911, filed on Dec. 22, 2022, now Pat. No. 11,812,256, which is a continuation of application No. 17/082,969, filed on Oct. 28, 2020, now Pat. No. 11,540,118.

(60) Provisional application No. 62/928,481, filed on Oct. 31, 2019.

(51) Int. Cl.
*H04W 12/02* (2009.01)
*G06F 21/62* (2013.01)
*H04M 3/51* (2006.01)
*H04W 4/18* (2009.01)
*H04W 4/20* (2018.01)
*H04W 76/16* (2018.01)
*H04L 9/40* (2022.01)
(Continued)

(52) U.S. Cl.
CPC ........ *H04W 12/02* (2013.01); *G06F 21/6245* (2013.01); *H04M 3/5183* (2013.01); *H04W 4/18* (2013.01); *H04W 4/20* (2013.01); *H04W 76/16* (2018.02); *H04L 63/0861* (2013.01); *H04M 3/42102* (2013.01); *H04M 2203/6009* (2013.01); *H04M 2203/6054* (2013.01); *H04M 2203/6081* (2013.01); *H04W 80/12* (2013.01)

(58) Field of Classification Search
CPC ..... H04W 4/16–203; H04W 8/18–245; H04W 80/12; H04W 76/00–16; H04L 63/0861; G06F 21/6245
See application file for complete search history.

(56) References Cited

U.S. PATENT DOCUMENTS 9,344,892 B1* 5/2016 Rodrigues ........... H04M 15/848
9,479,491 B1* 10/2016 Farnsworth ............ G06F 21/42
10,389,708 B1* 8/2019 Goodsitt ................ H04M 3/51
(Continued)

*Primary Examiner* — San Htun
(74) *Attorney, Agent, or Firm* — Fletcher Yoder, P.C.

(57) ABSTRACT

A system includes a client device including a processor, a telephony radio that supports telephony communications, and a data radio that supports data communications. The client device conducts, via the telephony radio, a call with a telephony service. Further the client device identifies a context of the call, identifies a subset of stored private data associated with the context of the call; and in parallel with the call, provides the subset of the stored private data, via a data radio, to a data service.

19 Claims, 4 Drawing Sheets

(51) Int. Cl.
*H04M 3/42* (2006.01)
*H04W 80/12* (2009.01)

(56) References Cited

U.S. PATENT DOCUMENTS

| | | |
|---|---|---|
| 2007/0047523 A1 | 3/2007 | Jiang |
| 2007/0269025 A1 | 11/2007 | Shieh |
| 2008/0220810 A1* | 9/2008 | Landschaft ............ H04M 3/493 |
| | | 455/550.1 |
| 2009/0175429 A1 | 7/2009 | Cohen et al. |
| 2009/0325646 A1 | 12/2009 | Stewart et al. |
| 2011/0143714 A1* | 6/2011 | Keast .................. H04W 12/068 |
| | | 455/411 |
| 2014/0274005 A1* | 9/2014 | Luna ....................... H04W 4/16 |
| | | 455/414.1 |
| 2014/0321629 A1* | 10/2014 | Brown .............. H04M 1/72439 |
| | | 379/130 |
| 2016/0344865 A1* | 11/2016 | Ehlen ................ H04M 3/42195 |

* cited by examiner

PARALLEL DATA PROVISION

CROSS REFERENCE TO RELATED APPLICATIONS

This application is a continuation of U.S. patent application Ser. No. 18/086,911, entitled, "PARALLEL DATA PROVISION," filed Dec. 22, 2022, which is a continuation of U.S. patent application Ser. No. 17/082,969, entitled, "PARALLEL DATA PROVISION," filed on Oct. 28, 2020, which claims priority to and the benefit of U.S. Provisional Application No. 62/928,481, entitled, "PARALLEL DATA PROVISION," filed Oct. 31, 2019, each of which is hereby incorporated by reference in its entirety for all purposes.

BACKGROUND

The present disclosure relates generally to data provision. More specifically, the current disclosure relates to automatic data provision in parallel to a telephony call.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure are described above. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments are generally directed toward data provision in parallel with a telephony call. As may be appreciated, telephone conversations are oftentimes used to provide sensitive data or initiate functions that may be susceptible to fraud. Traditionally, to counteract fraud, callers have been asked to audibly respond to security questions, such as "What are the last four digits of your social security number?", "What is your mother's maiden name?", "Who was your best friend in High School", etc. As calls sometimes get transferred amongst units, callers may have to answer these questions multiple times before their inquiries may be met. Unfortunately, this may be quite an undesirable experience for the callers. Further, by answering questions audibly, there is risk that nefarious eavesdroppers may gain access to security answers when in proximity to the caller.

The techniques described herein aim to solve these and other problems, by enabling a calling device to automatically provide data in parallel to a telephony call, without requiring audible responses (e.g., voice or touch tone) from the caller. Specifically, a telephony system may provide a telephony call context, indicating, for example, that the call is at a point where particular additional data is needed for progression of the call. The call context may be intercepted by the calling device and a radio of the calling device may provide the additional data to the telephony system, satisfying the security request without requiring audible responses from the caller.

Figure 1:
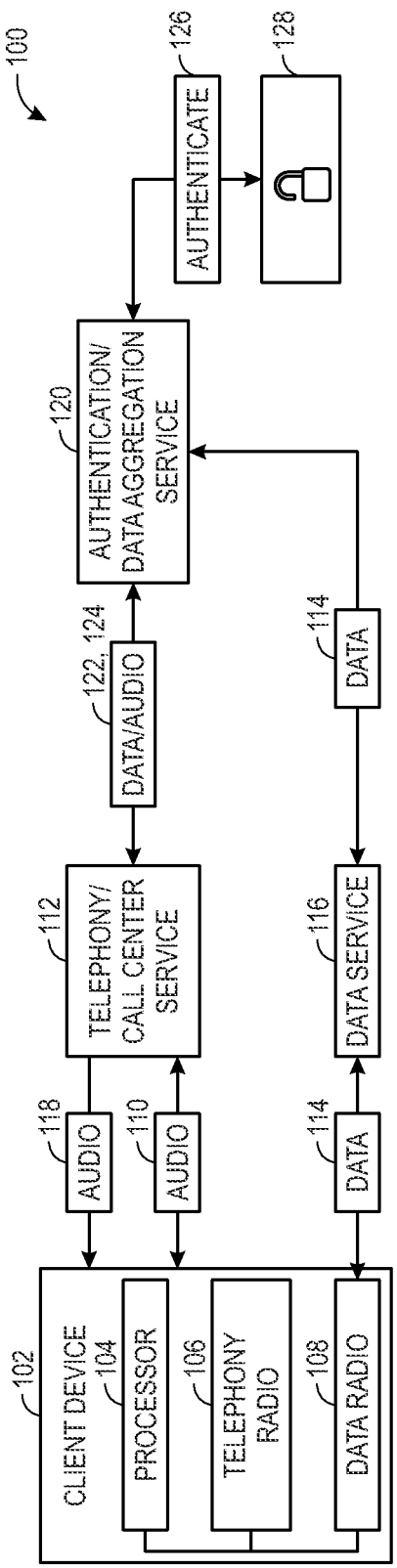
FIG. 1 is a schematic diagram, illustrating a system for data provision in parallel with a telephony call, in accordance with an embodiment.

Turning to a more detailed description of the data provision system, FIG. 1 is a schematic diagram, illustrating a system 100 for data provision in parallel with a telephony call, in accordance with an embodiment. The system 100 includes a client device 102, which includes a processor 104, a telephony radio 106, and a data radio 108. The telephony radio 106 supports telephony calls (e.g., audio 110 transmissions to a telephony/call center service 112), while the data radio 108 supports data transmission (e.g., data 114 to data services 116). In some embodiments, the telephony radio 106 and the data radio 108 may be a common radio. For example, the Long-Term Evolution (LTE) standard may support both voice (e.g., telephony calls) and data transmission over a common radio.

The telephony/call center service 112 may monitor the audio 110 to identify a context of the audio (e.g., the call). The context may provide an indication of a progression of the call, which may indicate data that is needed to facilitate the call. For example, certain call purposes may require additional security verifications to be completed. As discussed above, this traditionally has been implemented by verbally asking a user for particular verifying information, such as a portion of a social security number, mother's maiden name, etc. Unfortunately, however, this information is sometimes easily obtained by bad actors, making impersonation of the user possible. For example, when the user verbally provides such information over a phone call, a nefarious eavesdropper may obtain the verifying information. Further, in some instances, the verifying information may be obtained via Internet searches or other services.

The current techniques provide an alternative to this traditional approach with the aim of solving these and other problems. For example, using the current techniques, the telephony/call center service 112 identifies the context of the audio 110 and, in response, requests (e.g., via audio 118) additional information associated with the context from the client device 102. For example, the context may be identified based upon identified words or patterns of words spoken during the call.

Because the telephony/call center service 112 is communicating with the client device 102 via the telephony radio 106, the request may take the form of audio 118, such as a tone or pattern of tones. The processor 104 may monitor for the audio 118, which may indicate particular additional information requested for provision. For example, one tone or set of tones may indicate a first set of data to provide and a second tone or set of tones may indicate a second set of data to provide. In some embodiments, the data service 116 may receive the context of the call and provide a push notification or other data transmission to the client device 102 that indicates the call context. In some embodiments, the tones may be at frequencies not observable by the human ear, such that the calls are not interrupted by the tones.

In some embodiments, the context and additional information associated with the context may be identified locally at the client device 102. Thus, in certain embodiments, a request (e.g., via audio 116) from the telephony/call center service 112 may not be required.

Based upon the identified data that is requested, the identified data 114 is sent, via the data radio 108, to the data service 116. In some embodiments, there may be data 114 provision safeguards in place, helping to ensure that the data 114 is not sent until the user is authenticated, the telephony/call center service 112 and/or other services downstream of the telephony/call center service 112 are authenticated as a trusted service. The user may be authenticated by identifying pitch, word-choice, etc. that indicates that the user is the user with whom the data 114 pertains. The telephony/call center service 112 and/or other downstream services may be authenticated based upon a number of factors. For one, the telephony/call center service 112 may be authenticated as trusted based upon the call-in number used to access the telephony/call center service 112. When the call-in number is on a whitelist and/or is not on a blacklist, this may indicate that the telephony/call center service 112 is trusted. Additionally and/or alternatively, a security indication may be provided by the telephony/call center service 112 and/or downstream services, whether the security indication can be authenticated by the client device 102. For example, in some instances, a security tone understandable by the client device 102 may be provided to the client device 102 (e.g., from the telephony/call center service 112 and/or other downstream services). The client device 102 may authenticate the telephony/call center service 112 and/or downstream services when an expected security tone is provided.

The data 114 may be forwarded to the downstream services 120 for use. For example, here the downstream services 120 include authentication/data aggregation services that use the data 114 in combination with data 122 and/or audio 124 associated with the call provided from the telephony/call center service 112 to authenticate 126 access to resources and/or functions 128. As may be appreciated, by automatically providing the data 114 via the client device 102 independent of verbally/touch tonally communicating the data 114 may provide an added layer of protection in providing this data 114.

Figures 2, 3:
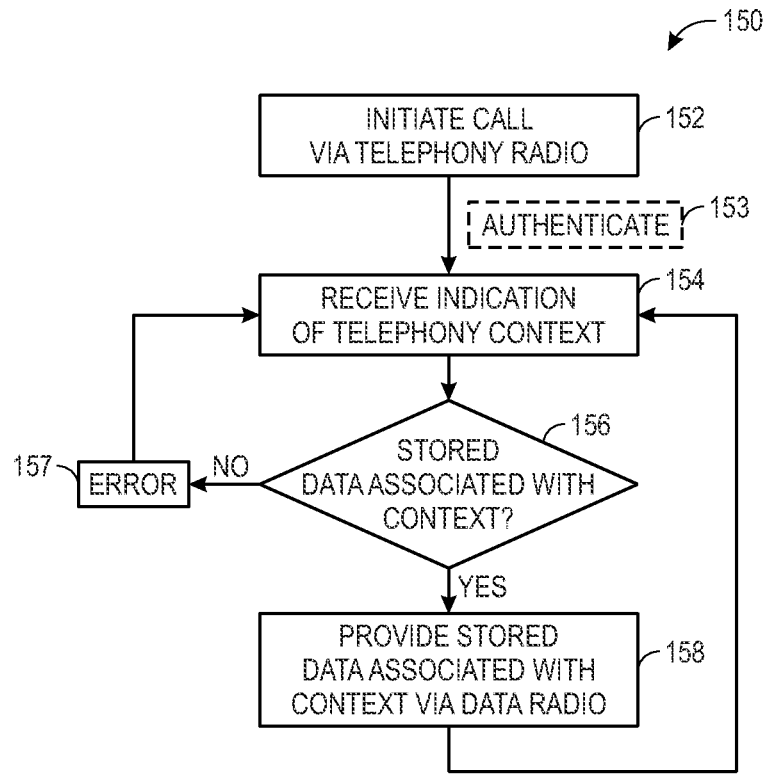
FIG. 2 is a flowchart, illustrating a process for provision of data in parallel with a telephony call, in accordance with an embodiment.
FIGS. 3 and 4 are flowcharts, illustrating processes for providing an indication of telephony context, in accordance with one or more embodiments.

As mentioned above, in the current techniques, data is provided in parallel with a telephony call. Turning to a more detailed discussion of this, FIG. 2 is a flowchart, illustrating a process 150 for provision of data in parallel with a telephony call, in accordance with an embodiment.

The process 150 begins by initiating a call via the telephony radio 152. For example, a telephone number may be entered and dialed to initiate a telephone call via the telephony radio. As indicated by dashed block 153, an authentication process may authenticate whether the call destination is a trusted destination and/or that the caller is a user permitted to access/use stored information. This can be done by determining whether the telephone number of the destination is on a whitelist, not on a blacklist, or both. The caller may be authenticated by identifying pitch, tone, word-choice, etc. of the caller. When authentication is present, the process 150 may only continue after identifying the call destination as a trusted destination and/or the caller is a user permitted to access/use the stored information.

At block 154, an indication of the telephony context is received/identified. The context provides an indication of particular data to be submitted to facilitate continuation of the call. For example, the context may indicate that the last four digits of a social security number should be submitted to facilitate secondary authentication to perform a requested call action. In some instances, the context may be determined based upon words spoken during the call. In some embodiments, the telephony system or a call a call center system (e.g., based upon input from a call center system operator) may provide an indication of the context/particular data.

The received information may be received via a telephone channel or a data channel. In the event that the information is received via the telephone channel, a tone and/or pattern of tones may be used to provide an indication of the context/particular data. For example, a first tone may indicate that Mother's maiden name should be supplied, while a second tone may indicate that a social security number should be provided.

The information may be initially be inputted by the user in an app of the client device. This information may be authentication protected, enabling access only to the user and/or the user's agents. As may be appreciated, the data can only be provided if there is such information available. Accordingly, a determination as to whether there is stored data that is associated with the context is made (decision block 156).

If no information associated with the context is available/stored in the system, the context may be ignored and/or an error indication may be provided in lieu of the information (block 157). The process 150 may then continue receiving additional indications.

If there is information associated with the context, the information is provided to supplement the call (block 158). In some embodiments, this information may be provided via the data radio to a data system. In other embodiments, tones and/or tone patterns may be supplied via the telephony radio. In some embodiments, the tones may be at frequencies not observable by the human ear, such that the calls are not interrupted by the tones. The process 150 may then continue monitoring for new indications of telephony context.

Figure 4:
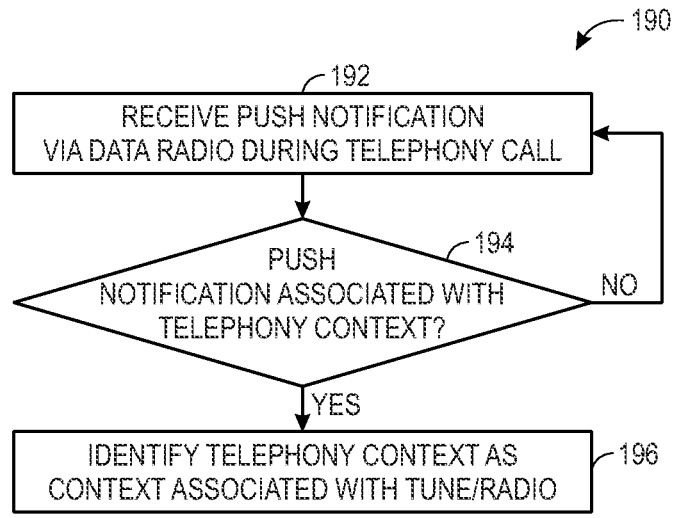

Having discussed the provision of data based upon the call context, FIGS. 3 and 4 are flowcharts, illustrating processes for providing an indication of telephony context, in accordance with one or more embodiments. Starting first with FIG. 3, this figure illustrates a process 170 for providing context via a telephony radio, in accordance with an embodiment.

The process 170 begins with receiving a tone, pattern of tones, and/or other audio via the telephony radio (block 172). As may be appreciated audio and/or tones may be used, as the telephony radio may utilize sound in communications. In some embodiments, the tones may be at frequencies not observable by the human ear, such that the calls are not interrupted by the tones.

Next, a determination is made as to whether the received tone/audio is associated with a particular context (decision block 174). For example, a first tone may indicate a context where the last four digits of a social security number should be provided, while a second tone may indicate a second context where a full social security number should be provided.

If no context is associated with the received tone and/or audio, the process 170 may restart. Optionally, the context may be set as an error context, indicating that an error indication should be provided.

If there is a context associated with the received tone and/or audio, the associated context can be identified and set as the current telephony context (block 176). This context may provide an indication of the particular information/data that should be provided to supplement the call.

FIG. 4 illustrates a different process 190, where the context is indicated via a push notification or other data via a data channel/data radio. At block 192, a push notification is received via the data radio during a telephony call.

Next, a determination is made as to whether the received push notification is associated with a particular context (decision block 194). For example, a first code or other text provided in the push message may indicate a context where the last four digits of a social security number should be provided, while a second code or other text in the push message may indicate that a full social security number should be provided.

If no context is associated with the received push notification, the process 190 may restart. Optionally, the context may be set as an error context, indicating that an error indication should be provided.

If there is a context associated with the push notification, the associated context can be identified and set as the current telephony context (block 196). This context may provide an indication of the particular information/data that should be provided to supplement the call.

Figure 5:
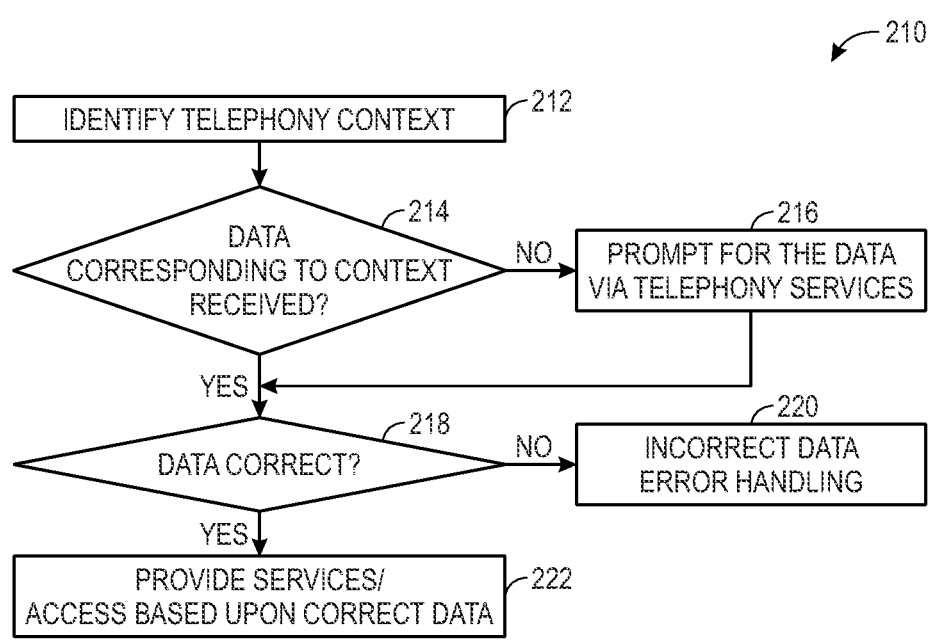
FIG. 5 is a flowchart, illustrating a process for facilitating subsequent telephony interactions based upon data received in parallel with the telephony call, in accordance with an embodiment.

Having discussed how the telephony call context is set, the discussion now turns to details of the use of this context. FIG. 5 is a flowchart, illustrating a process 210 for facilitating subsequent telephony interactions based upon data received in parallel with the telephony call, in accordance with an embodiment.

First, the telephony context is identified (block 212). As previously discussed (e.g., with regard to FIGS. 3 and 4), either the client device or the telephony services may identify the telephony context. Further, the context could be provided by data services via a push notification. Here, however, the telephony services (or other downstream services) identify data needed to proceed in the telephony call.

A determination is made as to whether the data corresponding to the context has been received (decision block 214). For example, if the context indicates that the telephony services need the caller's address, a determination is made as to whether the address has been received from the client device.

If not received, this may mean that the client device did not provide the context-required information. Accordingly, the system may provide, via the telephony services, a prompt for verbal provision of the data (block 216).

If the data corresponding to the context has been received, either by the client device (e.g., as determined by decision block 214) or verbally (e.g., in response to the prompt of block 216), a determination is made as to whether the data is correct. This may be done by determining whether the received data sufficiently matches previously stored data pertaining to the user/caller.

If the data is not correct, incorrect data error handling may be implemented (block 220). For example, an audible error indication, a push notification, etc. may be provided to the client device, indicating that correct data was not provided and thus the requested call function cannot be completed.

If the data is correct, the requested call function can proceed. For example, certain services and/or resource access may be provided based upon the correct data being provided (block 222).

Figure 6:
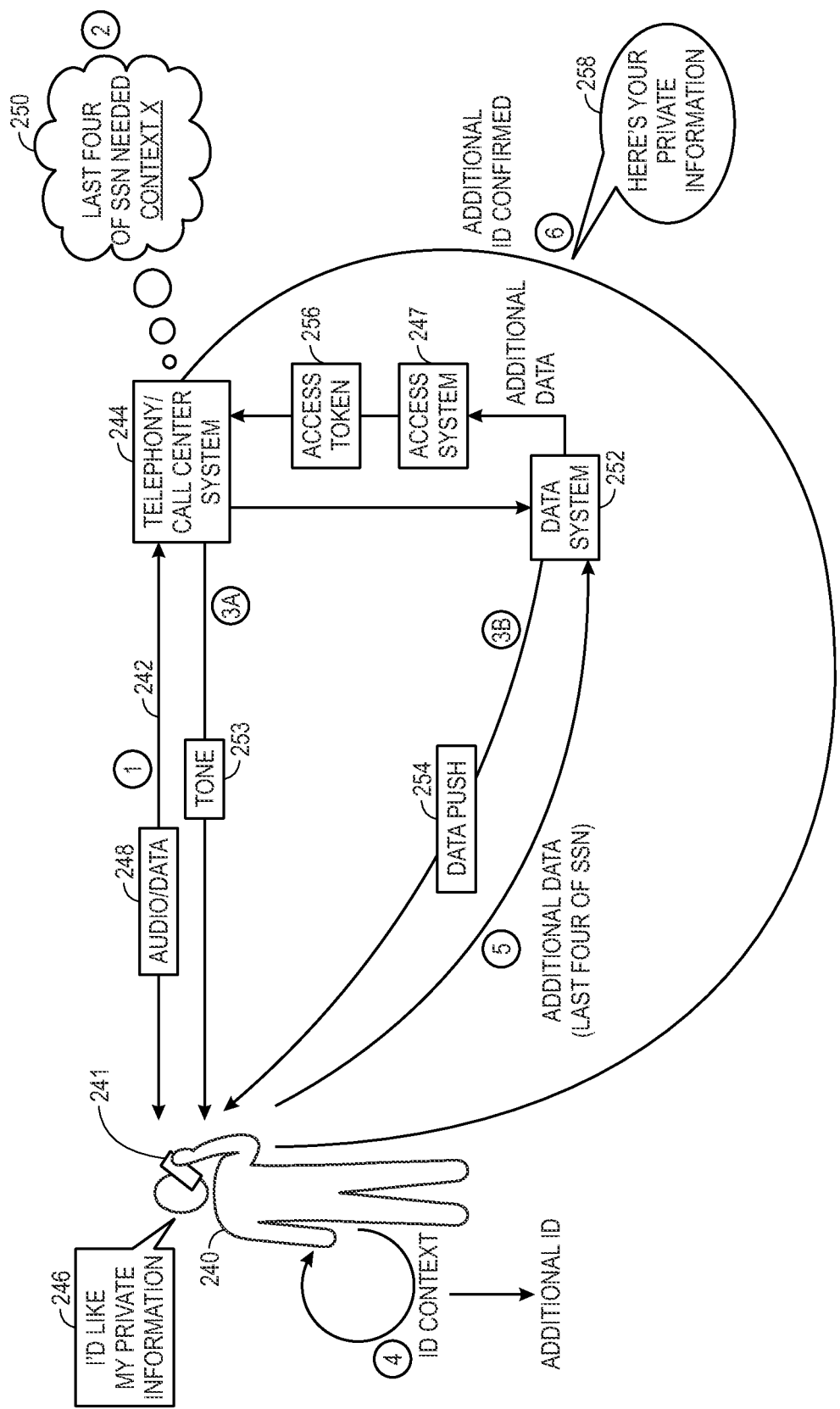
FIG. 6 is a schematic diagram, illustrating parallel data provision and use, in accordance with an embodiment of the present disclosure.

The discussion now turns to an example use of the techniques described herein. FIG. 6 is a schematic diagram, illustrating parallel data provision and use, in accordance with an embodiment of the present disclosure.

At step 1, a user 240 initiates a telephony call (indicated by arrow 242) with a telephony/call center system 244, via a client device 241. The user 240 provides a verbal indication 246 that "I'd like my private information". This verbal indication 246 is supplied via audio/data 248 to the telephony/call center system 244.

As may be appreciated, private information may be quite sensitive and additional security verifications may be in place to ensure only permitted persons are able to access such information. For example, in the current embodiment, additional authenticating information (e.g., here, the last four digits of the caller's social security number) may be required to provide access to the private information. The required information for access may be dictated by an access system 247, which provides an indication of the required data to the telephony/call center system 244. In the current example, the required information may be associated with Context X. Thus, at step 2, based upon this request, the telephony/call center system 244 identifies Context X as the context of the call, as indicated by cloud bubble 250.

The context may be provided via the telephony/call center system 244 and/or the data system 252. Further, in some embodiments, the context may be identified by the user's client device. Step 3A illustrates provision of a tone 253 via the telephony/call center system 244, where the tone 253 provides an indication of Context X. Step 3B illustrates a data push 254 from the data system 252, where the data push 254 provides an indication of Context X.

At step 4, the client device 241 receives the indication of Context X (e.g., as a tone 253 and/or the data push 254). The client device 241 may use a look up table or other association key to identify which context is associated with tone 253 and/or data push 254. Based upon the context identifier associated with the tone 253 and/or data push 254, the client device 241 identifies Context X and the data associated with Context X (e.g., the last four digits of the caller's social security number).

After identifying the data associated with Context X, the client device 241 accesses a local data store that stores information relating to the various contexts that can be supplied to the data system 252 to retrieve the data (e.g., the last four digits of the caller's social security number). At step 5, the retrieved data is provided to the data system 252, which forwards the data to the access system 247. The access system 247 may authenticate the retrieved data and, in response to a successful authentication, may provide an access token 256 to the telephony/call center system 244, indicating that the private information may be accessed by the caller.

In response to receiving the access token 256, at step 6, the telephony/call center system 244 may provide a telephony response 258, providing the private information.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A device, comprising:
   a telephony radio configured to support telephony communications;
   a data radio configured to support data communications;
   a data store storing private data associated with a user of the device; and
   a processor configured to:
      receive, via the telephony radio, an indication of a subset of private data associated with the user of the device to be provided during a call between the user and a telephony service;
      identify a data type associated with the subset of the private data based on the indication;
      access the data store to obtain the subset of the private data, wherein the subset of the private data is determined based on the identified data type, without a user input providing a response to a request for the subset of the private data; and
      in parallel with the call and via the data radio, transmit the subset of the private data to the telephony service.

2. The device of claim 1, wherein the processor is configured to:
   abstain from transmitting the subset of the private data until the user is authenticated.

3. The device of claim 2, wherein the processor is configured to:
   authenticate the user based upon voice pitch, word-choice, or both associated with the user.

4. The device of claim 1, wherein the processor is configured to:
   abstain from transmitting the subset of the private data until the telephony service is authenticated.

5. The device of claim 4, wherein the processor is configured to:
   authenticate the telephony service based upon a call-in number used to access the telephony service being on a whitelist of call-in numbers, the call-in number not being on a blacklist of call-in numbers, or both.

6. The device of claim 1, wherein the indication is received in response to a progression point of the call, an identified word or phrase during the call, or an identified tone or pattern of tones during the call.

7. The device of claim 1, wherein the subset of the private data is transmitted independent of an audible response, by the user, comprising the subset of the private data during the call.

8. The device of claim 1, wherein the telephony service is configured to provide the indication of the private data associated with the user to be provided during the call to the device.

9. The device of claim 8, wherein the indication is provided to the device in a form of a tone or pattern of tones via the telephony radio.

10. The device of claim 1, wherein the indication is provided via a push notification to the device.

11. The device of claim 1, wherein the data store comprises a lookup table that defines the data type of requested data that is associated with the indication.

12. The device of claim 1, wherein the processor is configured to receive a second indication of a right to access restricted data from an authentication service, wherein the authentication service is configured to:
   receive the subset of the private data;
   determine whether the subset of the private data matches known private data of the user; and
   transmit the second indication of the right to access restricted data to the device when the subset of the private data matches the known private data of the user.

13. A tangible, non-transitory, computer-readable medium, comprising computer-readable instructions that, when executed by at least one processor of a computer, cause the computer to perform operations comprising:
   receiving, via a telephony radio, an indication of a subset of private data associated with a user of a device to be provided during a call between the user and a telephony service;
   identifying a data type associated with the subset of the private data based on the indication;
   accessing a data store storing private data associated with the user of the device to obtain the subset of the private date, wherein the subset of the private data is determined based on the identified data type, without a user input providing a response to a request for the subset of the private data; and
   in parallel with the call and via a data radio, transmitting the subset of the private data to the telephony service.

14. The computer-readable medium of claim 13, wherein the computer is configured to perform operations comprising:
   authenticating the user based upon voice pitch, word-choice, or both associated with the user; and
   abstaining from transmitting the subset of the private data until the user is authenticated.

15. The computer-readable medium of claim 13, wherein the computer is configured to perform operations comprising receiving the indication in a form of a tone or pattern of tones or via a push notification.

16. The computer-readable medium of claim 13, wherein the data store comprises a lookup table that defines the data type of the private data to be provided during the call associated with the indication.

17. A computer-implemented method, comprising:
   receiving, via a telephony radio of a device, an indication of a subset of private data associated with a user of the device to be provided during a call between the device and a telephony service;
   identifying, via a processor of the device, a data type associated with the subset of the private data based on the indication;
   accessing a data store storing private data associated with the user of the device to obtain the subset of the private date, wherein the subset of the private data is determined based on the identified data type, without a user input providing a response to a request for the subset of the private data; and
   in parallel with the call and via a data radio of the device, transmitting the subset of the private data to the telephony service.

18. The computer-implemented method of claim 17, comprising:
   receiving, via the data radio, the telephony radio, or both, restricted data in response to providing the subset of the private data.

19. The computer-implemented method of claim 17, wherein
   the telephony service is configured to provide the indication to the device, enabling the device to identify the data type associated with the private data to be provided during the call.

* * * * *